–

3,056,808
15β-FLUORINATED CORTICOSTEROIDS
Donald E. Ayer, Portage Township, Kalamazoo County, Mich., assignor to The Upjohn Company, Kalamazoo, Mich., a corporation of Delaware
No Drawing. Filed Oct. 9, 1961, Ser. No. 143,557
10 Claims. (Cl. 260—397.3)

This invention relates to novel steroid compounds and processes for their preparation and is more particularly concerned with novel 15β-fluorinated corticosteroids and with processes for their preparation.

The novel compounds of the invention can be represented by the following formula:

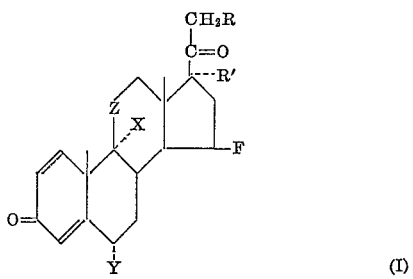

wherein the dotted line between carbon atoms 1 and 2 indicates that these carbon atoms are joined by a single or double bond, and wherein R is selected from the class consisting of hydrogen, hydroxy, and acyloxy, R' represents hydroxy and, when R represents hydrogen, R' also represents a group selected from the class consisting of hydrogen and acyloxy, X is selected from the class consisting of hydrogen and fluorine, Y is selected from the class consisting of hydrogen, fluorine and methyl, and Z is selected from the class consisting of β-hydroxymethylene and carbonyl, and wherein the acyl of the acyloxy group in each instance is that of an organic carboxylic acid preferably a hydrocarbon carboxylic acid containing from 1 to 12 carbon atoms, inclusive.

The organic carboxylic acids, from which the acylates of the invention are derived, include saturated and unsaturated aliphatic acids and aromatic acids such as acetic, propionic, butyric, isobutyric, tert.-butylacetic, valeric, isovaleric, caproic, caprylic, decanoic, dodecanoic acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, succinic, cyclopentylpropionic, α,α'-dimethylsuccinic, β,β-dimethylglutaric acids, and the like.

The novel compounds of the invention having the Formula I above possess valuable physiological activity. Illustratively, the novel compounds of the Formula I possess glucocorticoid, mineralocorticoid and anti-inflammatory activity. The anti-inflammatory activity of the compounds of the invention is markely greater than that of the corresponding known compounds which lack the 15β-fluoro group. In addition, the compounds of the invention possess the advantage that they exhibit much less sodium-retaining activity than the corresponding compounds which lack the 15β-fluoro group. Accordingly, the compounds having the Formula I above can be administered to mammals and birds, particularly to humans and valuable domestic animals, for the treatment of various inflammatory conditions of the skin, eyes, respiratory tract and the bones and internal organs due to bacterial or viral infections, contact-dermatitis and allergic reactions, and rheumatoid arthritis.

The novel compounds of the invention having the Formula I also possess progestational activity and affect the secretion of gonadotropins and thus regulate ovulation and endometrial and placental development and, particularly when used in conjunction with estrogens, for example, ethinylestradiol, and with androgens, for example, Halotestin (9α-fluoro-11β-hydroxy-17α - methyltestosterone), reduce fertility, and constitute effective therapy for dysmenorrhea, amenorrhea, endometriosis, threatened abortion and related gynecological disorders in humans and valuable domestic animals.

The novel compounds of Formula I above also possess central nervous system depressant activity which makes them useful as sedatives and general anesthetics in mammals, particularly in humans and animals. For example, they can be used as sedatives and anesthetics in the laboratory manipulation of experimental animals such as mice and rats.

The novel compounds of Formula I can be prepared and administered in a wide variety of oral or parenteral dosage forms singly, or in admixture with other active compounds. They can be associated with a pharmaceutical carrier which can be solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The novel compounds of the invention can for the most part be prepared according to the following reaction scheme.

REACTION SCHEME A

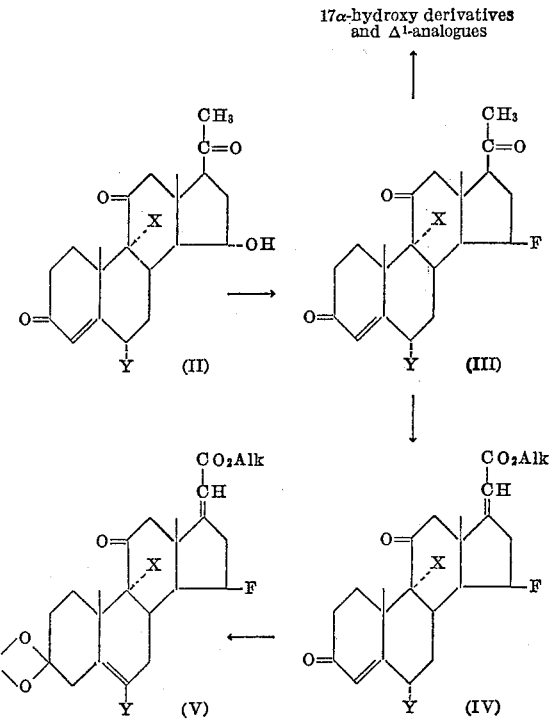

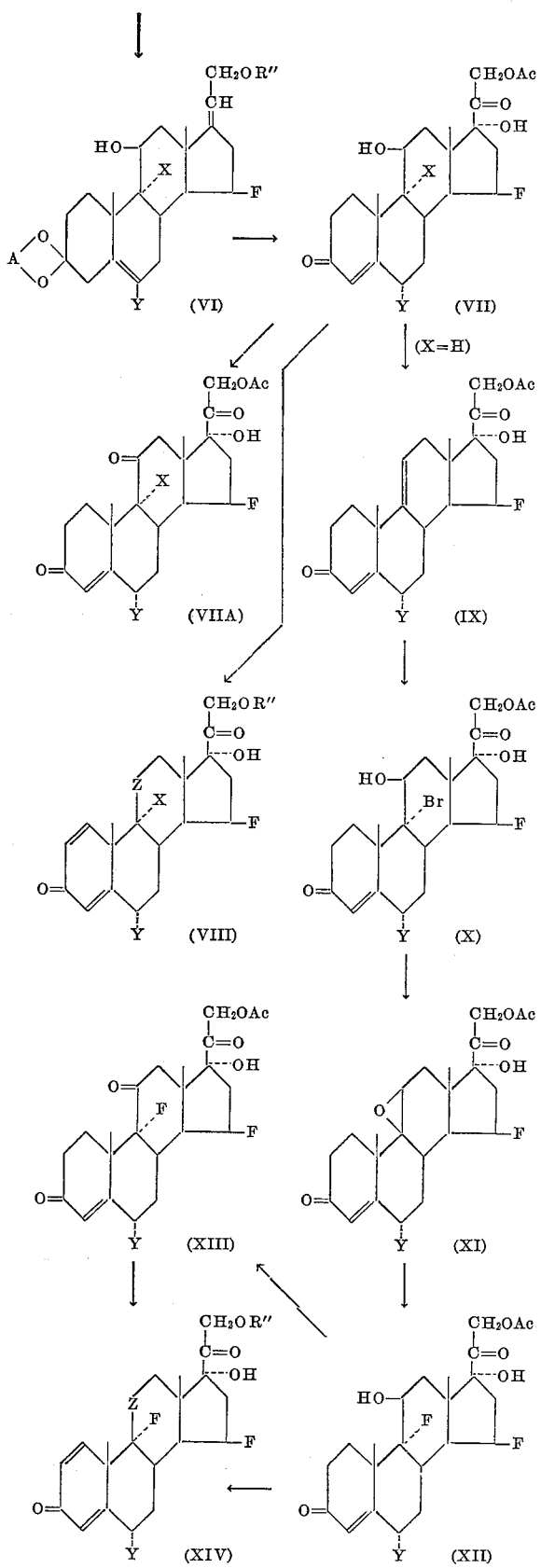

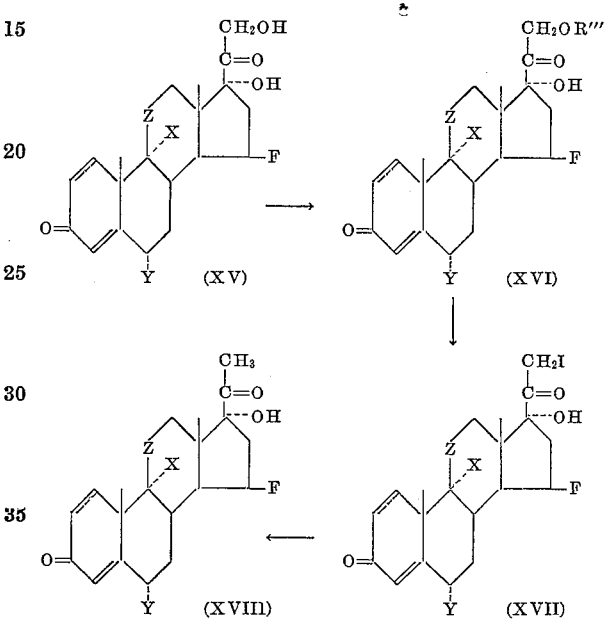

above, A represents an alkylene radical containing from 2 to 6 carbon atoms, inclusive, wherein the attaching oxygen to carbon bonds are separated by a chain of at least 2 and not more than 3 carbon atoms, and Alk is an alkyl radical containing from 1 to 8 carbon atoms, inclusive, such as methyl, ethyl, propyl, butyl, amyl, hexyl, heptyl, and octyl, and isomeric forms thereof.

The 21-deoxy-17-hydroxy compounds of the invention having the Formula I wherein R=H and R'=hydroxy or acyloxy can also be prepared from the corresponding 17α,21-dihydroxy compounds according to the following Reaction Scheme B:

REACTION SCHEME B

In the above formulae, X, Y, and Z have the significance hereinbefore defined and R''' represents an aryl or alkyl sulfonyl radical, preferably that of a hydrocarbon sulfonic acid containing from one to twelve carbon atoms, inclusive, for example, methanesulfonic acid, ethanesulfonic acid, benzenesulfonic acid, p-toluenesulfonic acid and the like.

The process of the invention shown diagrammatically in Reaction Scheme A is carried out in the following manner:

A 15α-hydroxy-11-ketoprogesterone having the Formula II is subjected to fluorination by treatment with a fluorinating agent having the formula:

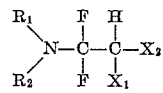

wherein $R_1$ and $R_2$ taken individually represent lower alkyl and $R_1$ and $R_2$ taken together with the attached nitrogen atom represent the residue of a heterocyclic radical containing from 5 to 7 ring atoms, inclusive, $X_1$ is selected from the class consisting of chlorine and fluorine, and $X_2$ is selected from the class consisting of chlorine, fluorine, and trifluoromethyl in an inert organic solvent, and advantageously in the presence of an acid catalyst, whereby replacement of the 15-hydroxy by fluorine takes place accompanied by inversion to yield the corresponding 15β-fluoro-11-ketoprogesterone (III).

The term "lower-alkyl" employed above in defining the fluorinating agent means an alkyl radical containing from 1 to 8 carbon atoms, inclusive, such as methyl, ethyl, propyl, butyl, amyl, hexyl, heptyl, octyl and isomeric forms thereof.

The term "heterocyclic radical containing from 5 to 7 ring atoms, inclusive" is inclusive of pyrrolidino, 2-methyl - pyrrolidino, 2,2 - dimethylpyrrolidino, and like In the above formulae X and Y have the significance hereinbefore defined, Ac represents the acyl radical of an organic carboxylic acid, preferably a hydrocarbon carboxylic acid containing from 1 to 12 carbon atoms, inclusive, R'' is selected from the class consisting of hydrogen and Ac, wherein Ac has the significance defined alkylpyrrolidino groups, 4-methylpiperazino, 2,4-dimethylpiperazino and like 4-alkylpiperazino groups, morpholino, piperidino, 2-methylpiperidino, 3-methylpiperidino, and like alkylpiperidino groups, hexamethyleneimino, homomorpholino, and the like.

Examples of fluorinating agents which can be used in the above process are N-(2-chloro-1,1,2-trifluoroethyl)diethylamine, N-(1,1,2,2-tetrafluoroethyl)diethylamine, N-(2-chloro-1,1,2-trifluoroethyl)dimethylamine, N-(2-chloro-1,1,2-trifluoroethyl)dipropylamine, N-(2-chloro-1,1,2-trifluoroethyl)diisobutylamine, N-(2 - chloro-1,1,2 - trifluoroethyl)dioctylamine, N-(2-chloro - 1,1,2 - trifluoroethyl)-methylethylamine, N-(1,1,2,2 - tetrafluoroethyl)diisopropylamine, N-(2,2-dichloro-1,1-difluoroethyl)diethylamine, N-(1,1,2,3,3,3 - hexafluoropropyl)diethylamine, and the like. The preferred fluorinating agent for use in the above fluorination process is N-(2-chloro-1,1,2-trifluoroethyl)diethylamine.

The term "inert organic solvent" means any organic solvent which does not react with the fluorinating agent and in which the steroid starting material is appreciably soluble such as aromatic and aliphatic hydrocarbons, halogenated hydrocarbons, esters, ketones, ethers and tertiary alcohols. Examples of such solvents are benzene, toluene, chlorobenzene, pentanes, hexanes, cyclohexane, ethyl acetate, butyl acetate, acetone, methyl ethyl ketone, tetrahydrofuran, ethyl ether, t-butyl alcohol, t-amyl alcohol, and the like. Advantageously, the inert organic solvent employed in the above fluorination process is a halogenated aliphatic hydrocarbon such as methylene chloride, chloroform, carbon tetrachloride, ethylene dichloride, ethylidene chloride, propylene chloride, trimethylene chloride, and the like. The solvent which is particularly preferred is methylene chloride.

Advantageously, but not necessarily, the process of the invention is carried out in the presence of an acid catalyst. The acid catalysts which are employed for this purpose are proton-forming acids such as the hydrogen halides, phosphoric acid, sulfuric acid, and the like or Lewis acids (see Fieser and Fieser, "Organic Chemistry," third edition, page 138, Reinhold, 1956) such as boron trifluoride, boron trichloride, aluminum trifluoride, arsenic trifluoride, phosphorus pentafluoride, titanium tetrafluoride, and the like. The preferred acids are the hydrogen halides, particularly hydrogen fluoride. In the case of hydrogen fluoride, the acid can be added to the reaction mixture or can be generated in situ, for example, by addition of the requisite quantity of water or an aliphatic alcohol such as methanol, ethanol, and the like, to produce the desired quantity of hydrogen fluoride by reaction with the fluorinating agent as follows:

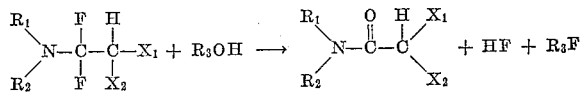

wherein $R_1$, $R_2$, $X_1$, $X_2$ have the significance hereinbefore described and $R_3$ represents hydrogen or lower-alkyl.

In general the acid catalyst is present in the reaction mixture in catalytic quantities only, i.e. of the order of about 0.1 to about 25 percent of the starting hydroxy steroid on a mole equivalent basis.

The fluorination of the 15α-hydroxy-11-oxoprogesterone (II) is carried out conveniently by bringing together the steroid (II), the fluorinating agent, and the acid catalyst in the presence of the inert organic solvent. The reaction is preferably carried out at a temperature within the range of about 0° C. up to the boiling point of the reaction mixture. The reaction time employed to complete the fluorination varies according to the reaction temperature and is generally of the order of one to eighteen hours at temperatures of about 0° C. to about 25° C. Shorter reaction times can be employed at higher reaction temperatures.

Advantageously the fluorinating agent is employed in excess of the stoichiometric quantity based on the steroid (II). Preferably the fluorinating agent is present in an excess of the order of about 1.1 to 10 moles per mole of starting steroid (II).

The desired 15β-fluoro-11-oxoprogesterone (III) so produced can be isolated from the reaction mixture and purified by conventional procedures, for example, by solvent extraction of the reaction product followed by removal of the solvent and recrystallization and/or chromatography of the resulting product.

The 15β-fluoro-11-oxoprogesterone (III) so obtained can be converted to the corresponding 11β-hydroxy compounds using procedures known in the art. For example, the 11-oxo compounds are converted to the corresponding 3,20-bisketal derivatives, for example by reaction with an alkylene glycol such as ethylene glycol, the 11-oxo-3,20-bisketal so obtained is reduced using, for example, lithium aluminum hydride to give the corresponding 11β-hydroxy-3,20-bisketal and the latter is then hydrolyzed to give the desired 15β-fluoro-11β-hydroxyprogesterone.

The compound (III) or the 15β-fluoro-11β-hydroxyprogesterones obtained as described above can then be subjected to 17α-hydroxylation by, for example, a microorganism of the genus Trichothecium using procedures such as that described in U.S. Patent 2,925,366 to obtain the desired 15β-fluoro-11-oxo-17α-hydroxyprogesterones and 15β-fluoro-11β,17α-dihydroxyprogesterones.

The 15β-fluoro-11-oxoprogesterone (III), the 15β-fluoro-11β-hydroxyprogesterones, the 15β-fluoro-11-oxo-17α-hydroxyprogesterones, or the 15β-fluoro-11β,17α-dihydroxyprogesterones obtained as described above can then be dehydrogenated using procedures known in the art to obtain the corresponding $\Delta^1$-analogues. The 1-dehydrogenation can be effected microbiologically using a 1-dehydrogenation microorganism, for example, of the genus Septomyxa using procedures such as that described in U.S. Patent 2,897,218, or can be effected chemically, for example, by treatment with selenium dioxide using procedures such as that described by Meystre et al., Helv. Chim. Acta, 39, 734 (1956), or that described in British patent specification No. 864,414.

In the next stage of the process of Reaction Scheme A, the 15β-fluoro-11-oxoprogesterone (III) is converted to the Favorskii ester (IV) using conventional procedures. For example, the compound (III) is reacted with more than 2 molar equivalents each of sodium methoxide and an alkyl oxalate to produce the 2,21-digloxalate; the latter is tribrominated with bromine followed by rearrangement with sodium methoxide in methanol to produce the corresponding 2-bromo-3,11-dioxo - 15β - fluoro - 4,17(20)-[cis]-pregnadien-21-oic acid alkyl ester; and removing the bromine from the latter compound by treatment with reducing agents such as zinc and acetic acid, chromous chloride, and the like, to produce the Favorskii ester (IV). Alternatively the bromine can be removed by treatment with sodium iodide in acetone followed by reaction with the aforementioned reducing agents or collidine. The procedure employed in the above series of reactions is advantageously that described in U.S. Patent 2,790,814. The Favorskii ester (IV) is then converted to the corresponding 3-ketal (V) using, for example, the procedure described in U.S. Patents 2,707,184 or 2,758,-993. Ethylene glycol is the preferred ketalizing agent but other glycols suitable for use include propylene-1,2-glycol, 2,2-dimethylpropylene-1,3-glycol and like lower alkylene glycols.

The 3-ketal (V) so obtained is reduced to the 3-ketal of the corresponding 3-oxo-15β-fluoro-$\Delta^{4,17(20)}$-pregnadiene-11β,21-diol (VI). The reduction is effected using conventional procedures, for example, by treatment with lithium aluminum hydride in the presence of an inert solvent such as ether, tetrahydrofuran, and the like using procedures such as that described in U.S. Patent 2,695,-906.

Acylation of the 21-hydroxy group of the compound (VI), for example, by reaction of the latter compound with the appropriate acid halide or acid anhydride in the presence of a tertiary base such as pyridine, followed by deketalization for example, by hydrolysis with mineral acid, of the 21-acylate of (VI) so obtained and oxidative hydroxylation of the 3-oxo-15β-fluoro-$\Delta^{4,17(20)}$-pregnadiene-11β,21-diol 21-acylate so obtained, yields the corresponding 15β-fluoro-11β,17α,21-trihydroxy-pregn-4-ene-3,20-dione 21- acylate (VII). The oxidative hydroxylation is carried out by conventional procedures, for example, by treatment with osmium tetroxide and an oxidizing agent, for example, hydrogen peroxide or N-methylmorpholine oxide peroxide using procedures such as that described in U.S. Patents 2,769,823, 2,769,824, and 2,769,825.

The 21-acylates (VII) can then be hydrolyzed to the corresponding free 21-alcohols, i.e. to the corresponding 15β - fluoro - 11β,17α,21 trihydroxypregn-4-ene - 3,20-dione by hydrolysis using conventional procedures, for example, by treatment with a base such as sodium bicarbonate in solution in a lower alkanol such as methanol.

The 21-acylates (VII) can also be oxidized, for example, by treatment with oxidizing agents such as chromic acid, sodium dichromate, and the like whereby the 11β-hydroxy group is oxidized and the corresponding 11-oxo compound (VIIA) is obtained. The latter compounds can be hydrolyzed to the corresponding free 21-hydroxy compounds using the procedure outlined above.

The compounds (VII) or (VIIA) or the corresponding free 21-hydroxy compounds can, if desired, be subjected to 1-dehydrogenation using either microbiological or chemical means as described above, to yield the corresponding 1-dehydro compounds (VIII). Where the 1-dehydrogenation is carried out using microbiological means a 21-acylate in the starting compound (VII) or (VIIA) will generally be removed during the dehydrogenation. The resulting free 21-hydroxy compound (VIII; R″=H) can be acylated, if desired, by reaction with the appropriate acid halide or acid anhydride using the procedures described above.

The 15β-fluoro-11β,17α,21-trihydroxy-pregn-4-ene-3,20-dione 21-acylates (VII) wherein the radical X represents hydrogen can then be treated by conventional procedures, for example, those described in U.S. Patent 2,838,499, for the introduction of a 9α-fluoro group. Thus the compounds (VII; X=H) can be subjected to 9,11-dehydration using conventional procedures, for example, treatment with an N-haloamide such as N-bromoacetamide followed by treatment with sulfur dioxide, to yield the corresponding $\Delta^{9(11)}$ compound (IX).

The compound (IX) so obtained is then converted to the corresponding 9α-halo-11β-hydroxy-compound (X) by the addition of the appropriate hypohalous acid, i.e. hypochlorous, hypoiodous acid, or hypobromous acid for example by treatment with the appropriate N-haloacetamide or like N-haloamide. The 9α-halo-11β-hydroxy compound (X) so obtained is converted to the corresponding 9β,11β-epoxy compound (XI) by reaction with a mild base such as potassium acetate.

The epoxide (XI) is reacted with hydrogen fluoride or a hydrogen fluoride releasing agent, to produce the corresponding 9α,15β-difluoro-11β,17α,21-trihydroxypregn-4-ene-3,20-dione 21-acylate (XII). The latter compound can be deacylated, if desired, using procedures hereinbefore described for the hydrolysis of 21-acylates, to obtain the corresponding free 21-hydroxy compounds.

The 9α,15β-difluoro-11β,17α,21-trihydroxypregn-4-ene-3,20-dione-21-acylates (XII) can be oxidized using chromic acid, sodium dichromate and like oxidizing agents to obtain the corresponding 9α,15β-difluoro-17α,21-dihydroxy-pregn-4-ene-3,1120-dione 21-acylates (XIII). The latter compounds can be hydrolyzed to the corresponding free 21-hydroxy compounds using the procedures described above. Both the compounds (XII and XIII) can be subjected to 1-dehydrogenation using either microbiological or chemical means as hereinbefore described to yield the corresponding 1-dehydro compounds (XIV). Where the 1-dehydrogenation is carried out by microbiological processes any 21-acyl group present in the starting materials will generally be eliminated during the reaction. The 21-free alcohols (XIV; R″=H) can be acylated by reaction with the appropriate acid halide or acid anhydride using procedures described above to obtain the corresponding 21-acylates (XIV: R″=Ac).

The 21-deoxy-17α-hydroxy compounds of the invention (I; R=H; R¹=hydroxy or acyloxy) can also be prepared using the sequence of reactions shown in Reaction Scheme B as follows: The compounds (VII), (VIIA), (VIII), (XII), (XIII), or (XIV), [represented generically as compound (XV) in Reaction Scheme B] are hydrolyzed, where necessary, to the corresponding free 21-alcohols and the latter are reacted with an organic sulfonyl halide such as methanesulfonyl chloride, toluenesulfonyl chloride, toluenesulfonyl bromide, benzenesulfonyl chloride, naphthalenesulfonyl chloride, and the like, in the presence of a tertiary base such as pyridine, to obtain the corresponding 21-sulfonate esters (XVI).

The 21-sulfonate esters (XVI) so obtained are converted to the corresponding 21-iodo compounds (XVII) by reaction with an alkali metal iodide, such as sodium iodide, potassium iodide, and the like, in the presence of a suitable solvent, for example an alkanone such as acetone, methyl ethyl ketone, and the like.

The 21-iodo compounds (XVII) are reacted with a reducing agent such as hydrogen iodide in acetic acid, zinc and acetic acid, chromous chloride, and the like, whereby the corresponding 21-deoxy compounds (XVIII) are obtained. Where the group Z in the 21-deoxy compound (XVIII) represents hydroxyl, said compound can be converted to the corresponding 11-oxo compound by reaction with an oxidizing agent such as chromic acid, sodium dichromate, N-bromoacetamide, N-bomosuccinimide, and the like, using conditions hereinbefore described.

The 21-deoxy compounds (XVIII) can be converted to the corresponding 17-acylates by reaction with the appropriate acid anhydride in the presence of an acid catalyst such as p-toluenesulfonic acid or a basic catalyst such as calcium carbonate. The 15α-hydroxy-11-oxoprogesterones (II) which are employed as starting materials in the process of the invention can be prepared from the corresponding 11-oxoprogesterones by subjecting the latter to the action of a 15α-hydroxylating microorganism such as *Penicillium urticae* using the procedures set forth in the following preparations.

The following preparations and examples are illustrative of the process and products of the present invention, but are not to be construed as limiting.

PREPARATION 1

*15α-Hydroxy-11-Oxoprogesterone*

A medium was prepared of 10 g. of Cerelose (dextrose), 20 g. of corn steep liquor and 1 liter of water and adjusted to a pH between 5.5 and 6. A 12 liter portion of this sterilized medium was inoculated with spores of *Penicillium urticae* ATCC 10120 and incubated for a period of 24 hours at a temperature of 26° C. using a rate of aeration and stirring such that the oxygen uptake was 13 millimoles per hour per liter [estimated according to the method of Cooper et al., Ind. Eng. Chem. 36, 504 (1944)]. To this medium containing a 24-hour growth of *Penicillium urticae* was added 2 g. of 11-oxoprogesterone, dissolved in 100 ml. of acetone. The mixture so obtained was incubated for a further 24 hours under the same temperature and aeration conditions before being harvested and clarified. The mycelium was washed twice with a roughly equal volume of acetone and was then extracted twice with an equal volume of methylene chloride. The acetone and methylene chloride extracts were added to the beer filtrate and the combined extracts and beer filtrate were extracted successively with two one-half by volume portions of methylene chloride and then with two one-fourth by volume portions of methylene chloride. The methylene chloride extracts were combined and washed with aqueous sodium bicarbonate solution and then with water. The washed extracts were dried over anhydrous sodium sulfate and filtered. The filtrate was evaporated to dryness and the residue was chromatographed on a column of magnesium silicate (Florisil). The column was eluted with Skelysolve B containing increasing proportions of acetone and those fractions which, on the basis of infrared analysis, were shown to contain the desired product were combined and evaporated to dryness. The residue was recrystallized twice from a mixture of acetone and ether and then once from a mixture of acetone and Skellysolve B. There was thus obtained 15α-hydroxy-11-oxoprogesterone in the form of a crystalline solid having a melting point of 227 to 229° C.; $[\alpha]_D^{20}$ +257° (ethanol).

PREPARATION 2

*15α-Hydroxy-6α-Methyl-11-Oxoprogesterone*

Using the procedure described in Preparation 1, but replacing 11-oxoprogesterone by 6α-methyl-11-oxoprogesterone (U.S. 2,968,655), there is obtained 15α-hydroxy-6α-methyl-11-oxoprogesterone.

PREPARATION 3

*15α-Hydroxy-6α-Fluoro-11-Oxoprogesterone*

Using the procedure described in Preparation 1, but replacing 11-oxoprogesterone by 6α-fluoro-11-oxoprogesterone (U.S. 2,838,501), there is obtained 15α-hydroxy-6α-fluoro-11-oxoprogesterone.

PREPARATION 4

*15α-Hydroxy-6α,9α-Difluoro-11-Oxoprogesterone*

Using the procedure described in Preparation 1, but replacing 11-oxoprogesterone by 6α,9α-difluoro-11-oxoprogesterone (U.S. 2,838,501), there is obtained 15α-hydroxy-6α,9α-difluoro-11-oxoprogesterone.

PREPARATION 5

*15α-Hydroxy-9α-Fluoro-11-Oxoprogesterone*

Using the procedure described in Preparation 1, but replacing 11 - oxoprogesterone by 9α-fluoro-11-oxoprogesterone [J. Fried et al., J. Am. Chem. Soc., 77, 1068 (1955)], there is obtained 15α-hydroxy-9α-fluoro-11-oxoprogesterone.

PREPARATION 6

*15α-Hydroxy-6α-Methyl-9α-Fluoro-11-Oxoprogesterone*

Using the procedure described in Preparation 1, but replacing 11-oxoprogesterone by 6α-methyl-9α-fluoro-11-oxoprogesterone (U.S. 2,968,655), there is obtained 15α-hydroxy-6α-methyl-9α-fluoro-11-oxoprogesterone.

EXAMPLE 1

*15β-Fluoropregn-4-Ene-3,11,20-Trione*

A solution of 10 g. (0.029 mole) of 15α-hydroxy-11-oxoprogesterone in 300 ml. of methylene chloride was cooled to 5° C. with exclusion of moisture and 9 ml. (10.7 g.; 0.0564 mole) of N-(2-chloro-1,1,2-trifluoroethyl) diethylamine was added. The resulting mixture was allowed to stand for 4.5 hours at 5° C. before ice water was added. The organic layer was separated, washed successively with water, aqueous sodium bicarbonate solution, and water before being dried over anhydrous magnesium sulfate. The dried solution was filtered and the filtrate was distilled initially at atmospheric pressure to remove solvent and finally at 90° C. under a pressure of 1 mm. of mercury to remove residual N,N-diethylchlorofluoroacetamide. The oily distillation residue was dissolved in methylene chloride and chromatographed on a column of magnesium silicate (Florisil). The column was eluted with 4 l. of mixed hexanes (Skellysolve B) containing 12.5% by volume of acetone. The first 4 l. of eluate was evaporated to dryness to yield 1.98 g. of pregna-4,14-diene-3,11,20-trione in the form of a crystalline solid having a melting point of 193 to 196° C. The next 3 l. of eluate was evaporated to give 1.59 g. of a mixture containing 2 parts of 15β-fluoropregn-4-ene-3,11,20-trione, 1 part of pregna-4,14-diene-3,11,20-trione, and 1 part of the 15-chlorofluoroacetate of 15α-hydroxypregn-4-ene-3,11,20-trione. The column was then eluted with Skellysolve B containing increased proportions of acetone up to 30% by volume. The next 4.5 l. of eluate was evaporated to obtain 2.28 g. of 15β-fluoropregn-4-ene-3,11,20-trione in the form of a crystalline solid having a melting point of 157 to 159° C. Later fractions of eluate yielded a further 1.7 g. of impure 15β-fluoropregn-4-ene-3,11,20-trione which was combined with the earlier impure fraction and rechromatographed under similar solvent conditions to obtain an additional 1.9 g. of product (total yield of 15β-fluoropregn-4-ene-3,11,20-trione= 42%). An analytical sample of 15β-fluoro-pregn-4-ene-3,11,20-trione having a melting point of 159 to 161° C. was obtained by recrystallization from a mixture of acetone and Skellysolve B. The ultraviolet spectrum of this compound (in ethanol) exhibited a maximum at 237.5 millimicrons (E=14,300).

*Analysis.*—Calcd. for $C_{21}H_{27}O_3F$: C, 72.80; H, 7.86; F, 5.48. Found: C, 73.42; H, 7.64; F, 5.20.

Using the above procedure, but replacing 15α-hydroxy-11 - oxoprogesterone by 15α-hydroxy-6α-methyl-11-oxoprogesterone, 15α - hydroxy - 6α - fluoro-11-oxoprogesterone, 15α - hydroxy - 6α,9α - difluoro-11-oxoprogesterone, 15α - hydroxy - 9α - fluoro-11-oxoprogesterone, or 15α - hydroxy - 6α - methyl-9α-fluoro-11-oxoprogesterone, there are obtained 15β - fluoro - 6α - methyl-11-oxoprogesterone, 6α,15β - difluoro-11-oxoprogesterone, 6α,9α,15β - trifluoro - 11 - oxoprogesterone, 9α,15β-difluoro-11-oxoprogesterone, and 6α - methyl - 9α,15β-difluoro-11-oxoprogesterone, respectively.

EXAMPLE 2

*15β-Fluoro-11β-Hydroxypregn-4-Ene-3,20-Dione*

A mixture of 1 g. of 15β-fluoropregn-4-ene-3,11,20-trione, 0.06 g. of p-toluenesulfonic acid, 5 ml. of ethylene glycol, and 100 ml. of benzene is stirred and heated under reflux. The water formed in the reaction is collected in a water trap. When the elimination of water is complete, the reaction mixture is cooled, washed with aqueous sodium bicarbonate solution, and then with water, and dried over anhydrous sodium sulfate. The dried solution is filtered, the filtrate is evaporated to dryness, and the residue is recrystallized from ethyl acetate.

A slurry of 1 g. of the 3,20-bisethylene ketal of 15β-fluoropregn-4-ene-3,11,20-trione so obtained in 20 ml. of benzene is added to a slurry of 0.35 g. of lithium aluminum hydride in 100 ml. of anhydrous ether at such a rate as to cause gentle refluxing. When the addition is complete, the reaction mixture is heated under reflux to complete the reaction and is then cooled and hydrolyzed with water. The organic layer is separated, washed with water, and dried over anhydrous sodium sulfate. The dried solution is filtered, the filtrate is evaporated to dryness, and the residue is recrystallized from ethyl acetate.

A mixture of 0.5 g. of the 3,20-bisethylene ketal of 15β-fluoro - 11β - hydroxypregn - 4-ene-3,20-dione so obtained, 20 ml. of acetone and 5 ml. of 3 N hydrochloric acid is heated under reflux for several hours before being diluted with water. The solid which separates is isolated by filtration and dried. There is thus obtained 15β-fluoro-11β-hydroxypregn-4-ene-3,20-dione in the form of a crystalline solid.

Using the above procedure, but replacing 15β-fluoropregn - 4 - ene - 3,11,20-trione by 15β-fluoro-6α-methylpregn - 4-ene-3,11,20-trione, 6α,15β-difluoropregn-4-ene-3,11,20 - trione, 6α,9α,15β-trifluoropregn-4-ene-3,11,20- trione, 9α,15β-difluoropregn-4-ene-3,11,20-trione, or 9α,15β - difluoro-6α-methylpregn-4-ene-3,11,20-trione, there are obtained 15β - fluoro - 11β - hydroxy-6α-methylpregn-4 - ene - 3,20-dione, 6α,15β-difluoro-11β-hydroxypregn-4-ene - 3,20 - dione, 6α,9α,15β - trifluoro-11β-hydroxypregn - 4 - ene - 3,20-dione, 9α,15β-difluoro-11β-hydroxypregn - 4 - ene - 3,20-dione, and 9α,15β-difluoro-11β-hydroxy-6α-methylpregn-4-ene,3,20-dione, respectively.

EXAMPLE 3

*15β-Fluoropregna-1,4-Diene-3,11,20-Trione*

A mixture of 0.5 g. of 15β-fluoropregn-4-ene-3,11,20-trione, 50 ml. of t-butyl alcohol, 0.5 ml. of acetic acid and 0.2 g. of selenium dioxide is heated under reflux for 48 hrs. At the end of this time an additional quantity of 0.2 g. of selenium dioxide is added and the heating is continued for approximately 20 hrs. The resulting mixture is then filtered and the filtrate is evaporated to dryness. The residue is dissolved in ethyl acetate and the solution so obtained is washed successively with cold aqueous sodium bicarbonate solution, aqueous ammonium polysulfide solution, aqueous ammonium hydroxide solution, water, dilute hydrochloric acid, and water. The washed solution is evaporated to dryness and the residue is dissolved in methylene chloride and chromatographed on a magnesium silicate (Florisil) column. The column is eluted with methylene chloride containing increasing proportions of acetone and those fractions which, on the basis of infrared analysis, are shown to contain the desired 15β-fluoropregna-1,4-diene-3,11,20-trione are combined and evaporated to dryness. The residue is recrystallized from aqueous acetone. There is thus obtained 15β-fluoropregna-1,4-diene-3,11,20-trione in the form of a crystalline solid.

Using the procedure described above, but replacing 15β-fluoropregn-4-ene-3,11,20-trione by 15β-fluoro-6α-methyl-11-oxoprogesterone,
6α,15β-difluoro-11-oxoprogesterone,
6α,9α,15β-trifluoro-11-oxoprogesterone,
9α,15β-difluoro-11-oxoprogesterone,
6α-methyl-9α,15β-difluoro-11-oxoprogesterone,
15β-fluoro-11β-hydroxypregn-4-ene-3,20-dione,
15β-fluoro-11β-hydroxy-6α-methylpregn-4-ene-3,20-dione,
6α,15β-difluoro-11β-hydroxypregn-4-ene-3,20-dione,
6α,9α,15β-trifluoro-11β-hydroxypregn-4-ene-3,20-dione,
9α,15β-difluoro-11β-hydroxypregn-4-ene-3,20-dione or
9α,15β-difluoro-11β-hydroxy-6α-methylpregn-4-ene-3,20-dione, there are obtained
15β-fluoro-6α-methylpregna-1,4-diene-3,11,20-trione,
6α,15β-difluoropregna-1,4-diene-3,11,20-trione,
6α,9α,15β-trifluoropregna-1,4-diene-3,11,20-trione,
9α,15β-difluoropregna-1,4-diene-3,11,20-trione,
9α,15β-difluoro-6α-methylpregna-1,4-diene-3,11,20-trione,
15β-fluoro-11β-hydroxypregna-1,4-diene-3,20-dione,
15β-fluoro-11β-hydroxy-6α-methylpregna-1,4-diene-3,20-dione,
6α,15β-difluoro-11β-hydroxypregna-1,4-diene-3,20-dione,
6α,9α,15β-trifluoro-11β-hydroxypregna-1,4-diene-3,20-dione,
9α,15β-difluoro-11β-hydroxypregna-1,4-diene-3,20-dione and
9α,15β-difluoro-11β-hydroxy-6α-methylpregna-1,4-diene-3,20-dione,
respectively.

EXAMPLE 4

*Methyl 3,11-Dioxo-15β-Fluoro-4,17(20)-[Cis]-Pregnadien-21-Oate*

To a stirred, nitrogen-purged solution of 2.42 g. (0.007 mole) of 15β-fluoropregn-4-ene-3,11,20-trione in 50 ml. of t-butyl alcohol at 60° C. was added 3.8 ml. (4.08 g., 0.028 mole) of ethyl oxalate followed by 3.9 g. (0.0175 mole) of 24.3% methanolic sodium methoxide. The resulting mixture was stirred for 45 minutes after the addition was complete and was then cooled and neutralized by the addition of 1 ml. of acetic acid and 0.85 g. of sodium acetate in 25 ml. of methanol. The neutral mixture was cooled to 0° C. and a solution of 3.36 g. (0.021 mole) of bromine in 10 ml. of methanol at minus 30° C. was added dropwise thereto over a period of 5 minutes. To the mixture so obtained was added 8.55 g. (0.0385 mole) of a 24.3% methanolic solution of sodium methoxide over a short period keeping the temperature below 15° C. The resulting mixture was warmed to 25° C. and stirred for 1 hour, after which 3 ml. of acetic acid and 2.4 g. of zinc dust was added and the mixture was stirred for a further 30 minutes. The reaction mixture was then filtered through diatomaceous earth (Celite) and the filtrate was evaporated to a small volume. The residue was dissolved in methylene chloride and washed successively with water, aqueous sodium bicarbonate solution, and water. The washed solution was evaporated to dryness and the residue was dissolved in methylene chloride and chromatographed on a column of magnesium silicate (Florisil). The column was eluted with Skellysolve B containing 12.5% by volume of acetone and those fractions which were found by paper chromatographic analysis to contain the desired material were combined and evaporated to dryness. The residue (1.52 g.) was recrystallized from a mixture of acetone and Skellysolve B. There was thus obtained 0.58 g. of methyl 3,11-oxo-15β-fluoro-4,17(20)-[cis]-pregnadiene-21-oate in the form of a crystalline solid having a melting point of 220 to 222° C. The ultra-violet spectrum of the compound (ethanol solution) exhibited a maximum at 231 millimicrons (E=23,200). The infrared spectrum of the compound (mineral oil mull) exhibited maxima at 1720, 1700, 1675, 1660, and 1620 reciprocal centimeters.

*Analysis.*—Calcd. for $C_{22}H_{27}O_4F$: C, 70.56; H, 7.27; F, 5.07. Found: C, 70.15; H, 7.38; F, 5.09.

Using the above procedure, but replacing 15β-fluoropregn-4-ene-3,11,20-trione as starting material by 15β-fluoro-6α-methyl-11-oxoprogesterone,
6α,15β-difluoro-11-oxoprogesterone,
6α,9α,15β-trifluoro-11-oxoprogesterone, or
6α-methyl-9α,15β-difluoro-11-oxoprogesterone, there are obtained
methyl 3,11-dioxo-15β-fluoro-6α-methyl-4,17(20)-[cis]-pregnadiene-21-oate,
methyl 3,11-dioxo-6α,15β-difluoro-4,17(20)-[cis]-pregnadiene-21-oate,
methyl 3,11-dioxo-6α,9α,15β-trifluoro-4,17(20)-[cis]-pregnadiene-21-oate,
methyl 3,11-dioxo-9α,15β-difluoro-4,17(20)-[cis]-pregnadiene-21-oate, and
methyl 3,11-dioxo-6α-methyl-9α,15β-difluoro-4,17(20)-[cis]-pregnadiene-21-oate, respectively.

EXAMPLE 5

*15β-Fluoro-11β,17α,21-Trihydroxypregn-4-Ene 3,20-Dione 21-Acetate*

A mixture of 2.59 g. of methyl 3,11-dioxo-15β-fluoro-4,17(20)-[cis]-pregnadien-21-oate, 150 mg. of p-toluenesulfonic acid monohydrate, and 5 ml. of ethylene glycol in 120 ml. of benzene was heated under reflux with stirring and azeotropic distillation of water until no further water was eliminated from the reaction mixture. The reaction mixture was then cooled to about 40° C., 0.4 ml. of pyridine was added and the mixture was cooled to room temperature. The benzene layer was separated, washed with water and dried over anhydrous magnesium sulfate.

The dried solution was filtered and the filtrate was evaporated to dryness. The residue was recrystallized from a mixture of ethyl acetate and Skellysolve B. There was thus obtained the 3-ethylene ketal of methyl 3,11-dioxo-15β-fluoro-4,17(20)-[cis]-pregnadien-21-oate in the form of a crystalline solid having a melting point of 203 to 205° C.

A solution of 3 g. of the above 3-ethylene ketal in 30 ml. of benzene was added to a mixture of 1 g. of lithium aluminum hydride and 75 ml. of ether which had previously been stirred for 2 hr. at room temperature. The resulting mixture was stirred for 1 hr. at room temperature before the excess hydride was decomposed by the addition of ethyl acetate and water. The reaction mixture was filtered and the filter cake was washed with ethyl acetate. The filtrate was evaporated to dryness under reduced pressure. The residue (3-ethylene ketal of 11β,21 - dihydroxy - 15β - fluoro-4,17(20)-[cis]-pregnadien-3-one) was dissolved in 4 ml. of pyridine and 8 ml. of acetic anhydride and was allowed to stand at room temperature for 18 hr. The resulting mixture was decomposed by pouring onto ice and water and the solid which separated was isolated by filtration and washed with water.

The washed solid (3-ethylene ketal of 11β,21-dihydroxy - 15β - fluoro - 4,17(20)-[cis]-pregnadien-3-one 21-acetate) was dissolved in a mixture of 100 ml. of acetone and 10 ml. of 5% sulfuric acid and allowed to stand for 20 hrs. at room temperature before adding 40 ml. of 4% sodium bicarbonate solution and evaporating the resulting mixture to a small volume. The residue was extracted with methylene chloride. The methylene chloride extract was washed with aqueous sodium bicarbonate solution and water before being evaporated to dryness. The residue was dissolved in methylene chloride and chromatographed on a column of magnesium silicate (Florisil). The column was eluted with Skellysolve B containing 12.5% by volume of acetone. Those fractions of the eluate which were found by paper chromatographic analysis to contain the desired product were combined and evaporated to dryness. There was thus obtained 11β,21-dihydroxy-15β-fluoro-4,17(20) - [cis] - pregnadien-3-one 21-acetate in the form of a crystalline solid.

A mixture of 1.93 g. of the latter compound, 106 ml. of t-butyl alcohol, 0.6 ml. of pyridine, 12 mg. of osmium tetroxide and 6 ml. (2.75 mol. eq.) of N-methylmorpholine oxide hydroperoxide in t-butanol was allowed to stand at room temperature under a nitrogen atmosphere for 21 hr. To the resulting mixture was then added a solution of 0.25 g. of sodium hydrosulfite in 50 ml. of water and the mixture was stirred for 30 minutes before being evaporated to a small volume. The residue was extracted with ethyl acetate and the extract was washed successively with water, aqueous sodium bicarbonate solution, and water. The washed extract was dried over anhydrous magnesium sulfate and filtered. The filtrate was evaporated to dryness and the residue was dissolved in methylene chloride and chromatographed on a column of magnesium silicate (Florisil). The column was eluted with Skellysolve B containing increasing portions of acetone and those fractions which were found by paper chromatographic analysis to contain the desired product were combined and evaporated to dryness. The residue was recrystallized from aqueous methanol. There was thus obtained 0.63 g. of 15β-fluoro-11β,17α,21-trihydroxypregn-4-ene-3,20-dione 21-acetate in the form of a crystalline solid having a melting point of 206 to 208° C. with decomposition.

An analytical sample having a melting point of 210 to 211° C., with decomposition, was obtained by further recrystallization from aqueous methanol. The ultraviolet spectrum of this compound (ethanol solution) exhibited a maximum at 241 millimicrons. The infrared spectrum of this compound (mineral oil mull) exhibited maxima at 3580, 3360, 1730, 1715, 1662, 1630, 1620 (sh.), 1595, 1265, and 1245 reciprocal centimeters.

*Analysis.*—Calcd. for $C_{23}H_{31}FO_6 \cdot \frac{1}{4}H_2O$: C, 64.96; H 7.44; F, 4.45. Found: C, 64.54; H, 7.68; F, 4.41.

On drying under high vacuum at 115° C., there is obtained the anhydrous material.

Using the procedure described above, but replacing methyl 3,11-dioxo-15β-fluoro-4,17(20)-[cis]-pregnadien-21-oate by methyl 3,11-dioxo-15β-fluoro-6α-methyl-4,17-(20)-[cis]-pregnadien-21-oate, methyl 3,11-dioxo-6α,15β-difluoro-4,17(20)-[cis]-pregnadien-21-oate, methyl 3,11-dioxo - 6α,9α,15β - trifluoro-4,17(20)-[cis]-pregnadien-21-oate, methyl 3,11-dioxo-9α,15β-difluoro-4,17(20)-[cis]-pregnadien-21-oate, or methyl 3,11-dioxo-6α-methyl-9α,-15β-difluoro-4,17(20)-[cis]-pregnadiene-21-oate, there are obtained 15β - fluoro-6α-methyl - 11β,17α,21 - trihydroxypregn-4-ene-3,20-dione 21-acetate, 6α,15β-difluoro-11β,-17α,21-trihydroxypregn-4-ene-3,20-dione 21-acetate, 6α,-9α,15β-trifluoro - 11β,17α,21 - trihydroxypregn-4-ene-3,20-dione 21-acetate, 9α,15β-difluoro-11β,17α,21-trihydroxypregn-4-ene-3,20-dione 21-acetate, and 6α-methyl-9α,15β-difluoro-11β,17α,21-trihydroxypregn-4-ene-3,20-dione 21-acetate, respectively.

EXAMPLE 6

*15β-Fluoro-11β,17α,21-Trihydroxypregn-4-Ene-3,20-Dione*

A mixture of 1 g. of 15β-fluoro-11β,17α,21-trihydroxypregn-4-ene-3,20-dione 21-acetate, 1 g. of potassium bicarbonate, 100 ml. of methanol and 15 ml. of water is purged with nitrogen and maintained at room temperature for several hours with stirring. The solution so obtained is neutralized by the addition of acetic acid and then distilled under reduced pressure to remove the methanol. The residue is extracted with methylene chloride and the extract is dried over anhydrous sodium sulfate. The dried solution is filtered and the filtrate is evaporated to dryness. There is thus obtained 15β-fluoro-11β,17α,21-trihydroxypregn-4-ene-3,20-dione.

Using the above procedure 15β-fluoro-6α-methyl-11β,-17α,21-trihydroxypregn-4-ene-3,20-dione, 6α,15β-difluoro-11β,17α,21-trihydroxypregn-4-ene-3,20-dione, 6α,9α,15β-trifluoro - 11β,17α,21 - trihydroxypregn-4-ene-3,20 - dione, 9α,15β-difluoro - 11β,17α,21 - trihydroxypregn-4-ene-3,20-dione, and 6α-methyl-9α,15β-difluoro-11β,17α,21-trihydroxypregn-4-ene-3,20-dione were obtained by hydrolysis of the corresponding 21-acetates.

EXAMPLE 7

*15β-Fluoro-11β,17α,21-Trihydroxypregn-4-Ene-3,20-Dione 21-Propionate*

A solution of 1 g. of 15β-fluoro-11β,17α,21-trihydroxypregn-4-ene-3,20-dione in 10 ml. of pyridine and 10 ml. of propionic anhydride is allowed to stand for several hours at room temperature before being poured into water. The solid which separates is isolated by filtration, washed with water and recrystallized from aqueous methanol. There is thus obtained 15β-fluoro-11β,17α,21-trihydroxypregn-4-ene-3,20-dione 21-propionate in the form of a crystalline solid.

In like manner, but replacing propionic anhydride by the appropriate hydrocarbon carboxylic acid anhydride, or acid halide, there are prepared other 21-esters of 15β-fluoro - 11β,17α,21-trihydroxypregn-4-ene-3,20-dione such as the 21-trimethylacetate, 21-butyrate, 21-hexanoate, 21β-cyclopentylpropionate, 21-hemisuccinate, 21-glutarate, 21-β,β-dimethylglutarate, 21-benzoate, 21-phenylacetate, and the like.

In like manner by reacting any of the compounds named in the paragraph following Example 6 with the appropriate acid anhydride or acid halide there is obtained the corresponding 21-acylate.

EXAMPLE 8

*15β-Fluoro-17α,21-Dihydroxypregn-4-Ene-3,11,20-Trione 21-Acetate*

A solution containing 0.1 g. of 15β-fluoro-11β,17α,21- trihydroxypregn-4-ene-3,20-dione 21-acetate, 1 ml. of acetic acid, 20 mg. of chromic anhydride and 1 drop of water is shaken and allowed to stand for several hours at room temperature. Thereafter the solution is poured into water and the solid which separates is isolated by filtration, washed with water, and dried. There is thus obtained 15β - fluoro - 17α,21-dihydroxypregn-4-ene-3,11,20-trione 21-acetate.

Using the above procedure, but replacing 15β-fluoro-11β,17α,21 - trihydroxypregn - 4 - ene - 3,20 - dione 21-acetate by 15β-fluoro-6α-methyl-11β,17α,21-trihydroxypregn - 4 - ene - 3,20 - dione 21 -acetate, 6α,15β - difluoro-11β,17α,21 - trihydroxypregn - 4 - ene - 3,20 - dione, 21 - acetate, 6α,9α15β - trifluoro - 11β,17α,21 - trihydroxypregn - 4 - ene - 3,20 - dione 21 - acetate, 9α,15β-difluoro-11β,17α,21 - trihydroxypregn - 4 - ene - 3,20-dione 21-acetate, or 6α-methyl-9α,15β-difluoro-11β,17α, 21 - trihydroxypregn - 4 - ene - 3,20 - dione 21-acetate, there are obtained 15β - fluoro - 6α - methyl - 17α,21-dihydroxypregn - 4 - ene - 3,11,20 - trione 21 - acetate, 6α, 15β - difluoro - 17α,21 - dihydroxypregn - 4 - ene - 3, 11,20 - trione 21 - acetate, 6α,9α,15β - trifluoro - 17α,21-dihydroxypregn - 4 - ene - 3,11,20 - trione 21-acetate, 9α, 15β - difluoro - 17α,21-dihydroxypregn - 4 - ene - 3,11,20-trione 21 - acetate, and 6α-methyl-9α,15β-difluoro-17α,21-dihydroxypregn - 4 - ene - 3,11,20 - trione 21-acetate, respectively.

The 21-acetates obtained as described above can be converted to the corresponding free 21-hydroxy compounds using the procedure described in Example 6. The free 21-hydroxy compounds can be converted to other 21-acylates by reaction with the appropriate acid anhydride or acid halide using the procedure described in Example 7.

EXAMPLE 9

15β-Fluoro-11β,17α,21-Trihydroxy-1,4-Pregnadiene 3,20-Dione 21-Acetate

Using the procedure described in Example 3, but replacing 15β - fluoropregn - 4 - ene - 3,11,20 -trione by 15β - fluoro - 11β,17α,21 -trihydroxypregn - 4 - ene - 3,20-dione 21-acetate, there is obtained 15β - fluoro - 11β,17α, 21 - trihydroxy - 1,4 - pregnadiene - 3,20 - dione 21-acetate.

Similarly, using the procedure described in Example 3 but replacing 15β - fluoropregn - 4 - ene - 3,11,20 - trione by 15β - fluoro - 17α,21 - dihydroxypregn - 4 - ene-3,11,20 - trione 21-acetate, 15β - fluoro - 6α -methyl - 11b, 17α,21 - trihydroxypregn - 4 - ene - 3,20 - dione 21-acetate, 15β - fluoro - 6α - methyl - 17α,21 - dihydroxypregn-4 - ene - 3,11,20 - trione 21-acetate, 6α,15β - difluoro - 11β, 17α,21 - trihydroxypregn - 4 - ene - 3,20 - dione 21-acetate, 6α,15β - difluoro - 17α,21 - dihydroxypregn - 4 - ene-3,11,20 - trione 21-acetate, 6α,9α,15β - trifluoro - 11β,17α, 21 - trihydroxypregn - 4 - ene - 3,20 - dione 21-acetate, 6α,9α,15β - trifluoro - 17α,21 - dihydroxypregn - 4 - ene-3,11,20 - trione 21-acetate, 9α,15β - difluoro - 17α,21-dihydroxypregn - 4 - ene - 3,11,20 - trione 21-acetate, 6α-methyl - 9α,15β - difluoro - 11β,17α,21 - trihydroxypregn-4 - ene - 3,20 - dione 21-acetate, or 6α - methyl - 9α,15β-difluoro - 17α,21 - dihydroxypregn - 4 - ene - 3,11,20-trione 21-acetate there are obtained 15β - fluoro - 17α,21-dihydroxy - 1,4 - pregnadiene - 3,11,20 - trione 21-acetate, 15β - fluoro - 6α - methyl - 11β,17α,21 - trihydroxy - 1,4-pregnadiene - 3,20 - dione 21-acetate, 15β - fluoro - 6α-methyl - 17α,21 - dihydroxy - 1,4 - pregnadiene - 3,11,20-trione 21-acetate, 6α,15β - difluoro - 11β,17α,21 - trihydroxy - 1,4 - pregnadiene - 3,20 - dione 21-acetate, 6α,15β-difluoro - 17α,21 - dihydroxy - 1,4 - pregnadiene - 3,11,20-trione 21-acetate, 6α, 9α,15β - trifluoro - 11β,17α,21 - trihydroxy - 1,4 - pregnadiene - 3,20 - dione 21-acetate, 6α, 9α,15β - trifluoro - 17α,21 - dihydroxy - 1,4 - pregnadiene - 3,11,20 - trione 21-acetate, 9α,15β - difluoro-17α,21 - dihydroxy - 1,4 - pregnadiene - 3,11,20 - trione 21-acetate, 6α - methyl - 9α,15β - difluoro - 11β,17α,21-trihydroxy - 1,4 - pregnadiene - 3,20 - dione 21-acetate, and 6α - methyl - 9α,15β - difluoro - 17α,21 - dihydroxy-1,4 - pregnadiene - 3,11,20 - trione 21-acetate, respectively. The aforementioned compounds can be converted to the corresponding free 21-hydroxy compounds using the procedure described in Example 6. The free 21-alcohols so obtained can be converted to the corresponding 21-acylates by reaction with the appropriate acid anhydride or acid halide using the procedure described in Example 7.

EXAMPLE 10

15β-Fluoro-17α,21-Dihydroxy-9β,11β-Oxidopregn-4-Ene-3,20-Dione 21-Acetate

To a solution of 0.7 g. of 15β-fluoro-11β,17α,21-trihydroxypregn - 4 - ene - 3,20 - dione 21-acetate in 15 ml. of pyridine was added 0.38 g. of N-bromoacetamide. The mixture was stirred under an atmosphere of nitrogen for 20 minutes at 25° C. and then cooled to 10° C. Sulfur dioxide was passed over the surface of the cooled solution for 15 minutes after which the reaction mixture was diluted with ice water. The solid which separated was isolated by filtration, washed with water and dried. The 15β - fluoro - 17α,21 - dihydroxy - 4,9(11) - pregnadiene - 3,20 - dione 21-acetate (0.53 g.) so obtained was dissolved in a mixture of 10 ml. of methylene chloride and 18 ml. of t-butyl alcohol. To this solution was added 0.16 ml. of 70% perchloric acid in 1.25 ml. of water, and 0.25 g. of N-bromoacetamide in 2.5 ml. of t-butyl alcohol. The mixture was stirred for 15 minutes at 25 to 30° C. and 0.25 g. of sodium sulfite in 2.5 ml. of water was added. The resulting solution was concentrated under reduced pressure and the residue was diluted with ice water. The solid which separated was isolated by filtration, washed with water and dried.

The 9α - bromo - 15β - fluoro - 11β,17α,21 - trihydroxypregn - 4 - ene - 3,20 - dione 21-acetate (0.55 g.) so obtained was dissolved in 15 ml. of acetone and heated under reflux with 0.6 g. of potassium acetate for 24 hrs. The resulting mixture was evaporated to dryness and the residue was shaken with a mixture of water and methylene chloride. The methylene chloride layer was separated, washed with water, and dried over anhydrous magnesium sulfate. The dried solution was filtered and the filtrate was evaporated to dryness. The residue (0.486 g.) was dissolved in methylene chloride and chromatographed on a column of magnesium silicate (Florisil). The column was eluted with Skellysolve B containing 12.5% by volume of acetone and those fractions which, on the basis of paper chromatographic analysis, were shown to contain the desired product, were combined and evaporated to dryness. There was thus obtained 0.359 g. of 15β-fluoro - 17α,21 - dihydroxy - 9β,11β - oxidopregn - 4 - ene-3,20 - dione 21-acetate in the form of a crystalline solid having a melting point of 205 to 207° C.

Using the above procedure, but replacing 15β-fluoro-11β,17α,21 - trihydroxypregn - 4 - ene - 3,20 - dione 21-acetate by the 21-acetates or other 21-acylates of 15β-fluoro - 6α - methyl - 11β,17α,21 - trihydroxypregn - 4-ene - 3,20 - dione or 6α,15β - difluoro - 11β,17α,21 - trihydroxypregn - 4 - ene - 3,20 - dione, there are obtained the corresponding 21-acylates of 15β - fluoro - 6α - methyl - 17α,21 - dihydroxy - 9β,11β - oxidopregn - 4 - ene-3,20 - dione, and 6α,15β - difluoro - 17α,21 - dihydroxy-9β,11β - oxidopregn - 4 - ene - 3,20 - dione, respectively.

EXAMPLE 11

9α,15β-Difluoro-11β,17α,21-Trihydroxypregn-4-Ene-3,20-Dione 21-Acetate

A solution of 0.35 g. of 15β-fluoro-17α,21-dihydroxy-9β,11β-oxipregn-4-ene-3,20-dione 21-acetate in 3.5 ml. of methylene chloride was cooled to −70° C. and added to a mixture of 3 g. of anhydrous hydrogen fluoride and 5.3 ml. of tetrahydrofuran at −20° C. The mixture was allowed to stand for 16 hours at −20° C. and then for 4 hrs. at +5° C. before being poured into a stirred ice-cold solution of 21.6 g. of sodium bicarbonate in 100 ml. of water. The resulting mixture was extracted with ethyl acetate and the organic extract was washed with water, dried over anhydrous magnesium sulfate, and filtered. The filtrate was evaporated to dryness and the residue was recrystallized twice from a mixture of acetone and Skellysolve B. There was thus obtained 110 mg. of 9α,15β-difluoro - 11β,17α,21 - trihyroxypregn-4-ene-3,20-dione 21-acetate in the form of a crystalline solid having a melting point of 213 to 214° C., with decomposition. The ultraviolet spectrum of this compound (in ethanol solution) exhibited a maximum at 238 millimicrons.

*Analysis.*—Calcd. for $C_{23}H_{30}F_2O_6$: C, 62.71; H, 6.87; F, 8.63. Found: C, 63.02; H, 6.85; F, 8.12.

Using the above procedure, but replacing 15β-fluoro-17α,21-dihydroxy-9β,11β-oxidopregn-4-ene-3,20-dione 21-acetate by the 21-acetates or other 21-acylates of 15β-fluoro - 6α - methyl-17α,21-dihydroxy-9β,11β-oxidopregn-4-ene-3,20-dione or 6α,15β-difluoro-17α,21-dihydroxy-9β,11β-oxidopregn-4-ene-3,20-dione, there are obtained the corresponding 21-acylates of 9α,15β-difluoro-6α-methyl-11β,17α,21-trihydroxypregn-4-ene-3,20-dione and 6α,9α,15β-trifluoro-11β,17α,21-trihydroxypregn-4-ene - 3,20-dione, respectively.

EXAMPLE 12

*9α,15β-Difluoro-11β,17α,21-Trihydroxy-1,4-Pregnadiene-3,20-Dione 21-Acetate*

A mixture of 300 mg. of 9α,15β-difluoro-11β,17α,21-trihydroxypregn-4-ene-3,20-dione 21-acetate, 40 ml. of t-butyl alcohol, 0.4 ml. of acetic acid, and 150 mg. of selenium dioxide was heated under reflux for 44 hrs. An additional 150 mg. of selenium dioxide was then added and the mixture was heated for an additional 19 hrs. The mixture was filtered and the filtrate was evaporated to dryness. The residue was dissolved in ethyl acetate and the solution so obtained was washed successively with cold aqueous sodium bicarbonate solution, aqueous ammonium polysulfide solution, dilute ammonium hydroxide solution, water, dilute hydrochloric acid, and water. The washed solution was dried over anhydrous magnesium sulfate and filtered. The filtrate was evaporated to dryness and the residue was dissolved in methylene chloride containing 5 by volume of acetone and chromatographed on a column of 100 g. of magnesium silicate (Florisil). The column was eluted with 1.5 l. of methylene chloride containing 7.5% by volume of acetone followed by 750 ml. of methylene chloride containing 12.5% of acetone. The eluate obtained was evaporated to dryness and the residue (200 mg. was recrystallized twice from a mixture of acetone and Skellysolve B. There was thus obtained 60 mg. of 9α,15β - difluoro - 11β,17α,21-trihydroxy-1,4-pregnadiene-3,20-dione 21 acetate in the form of a crystalline solid having a melting point of 232 to 233° C., with decomposition. The ultraviolet spectrum of the compound (in ethanol solution) exhibited a maximum at 238 millimicrons ($\epsilon$=16,000). The infrared spectrum of the compound (mineral oil mull) exhibited maxima at 3560, 3470, 3330, 1750, 1740, 1710, 1665, 1625, 1608, 1230, and 1215 reciprocal centimeters.

*Analysis.*—Calcd. for $C_{23}H_{28}F_2O_6$: C, 63.00; H, 6.44; F, 8.67. Found: C, 63.26; H, 6.24; F, 8.62.

EXAMPLE 13

*9α,15β-Difluoro-11β,17α,21-Trihydroxy-1,4-Pregnadiene-3,20-Dione*

Using the procedure described in Example 6, but replacing 15β - fluoro - 11β,17α,21 - trihydroxypregn-4-ene-3,20-dione 21-acetate by 9α,15β-difluoro-11β,17α,21-trihydroxy-1,4-pregnadiene-3,20-dione 21-acetate, there is obtained 9α,15β-difluoro-11β,17α,21-trihydroxy-1,4-pregnadiene-3,20-dione.

EXAMPLE 14

*9α,15β-Difluoro-11β,17α,21-Trihydroxy-1,4-Pregnadiene-3,20-Dione 21-Propionate*

Using the procedure described in Example 7, but replacing 15β - fluoro - 11β,17α,21-trihydroxypregn-4-ene 3,20-dione by 9α,15β-difluoro-11β,17α,21-trihydroxy-1,4-pregnadiene-3,20-dione, there is obtained 9α,15β-difluoro-11β,17α,21-trihydroxy-1,4-pregnadiene-3,20-dione 21-propionate.

Similarly, by reacting 9α,15β-difluoro-11β,17α,21-trihydroxy-1,4-pregnadiene-3,20-dione with the appropriate acid anhydride or acid halide in the presence of pyridine there are obtained the corresponding 21-acylates such as the 21-benzoate, 21-isobutyrate, 21-valerate, 21-hexanoate, 21-trimethylacetate, 21-β-cyclopentylpropionate, 21-hemisuccinate, 21-glutarate, and the like.

EXAMPLE 15

*9α,15β-Difluoro-11β,17α,21-Trihydroxy-1,4-Pregnadiene-3,20-Dione 21-Methanesulfonate*

A solution of 1 g. of 9α,15β-difluoro-11β,17α,21-trihydroxy-1,4-pregnadiene-3,20-dione in 7 ml. of pyridine is cooled to 0° C. and treated with 0.3 ml. of methanesulfonyl chloride. The resulting mixture is allowed to stand at 0° C. to 5° C. for several hours and is then diluted with water and extracted three times with methylene chloride. The methylene chloride extracts are combined, washed with an excess of dilute hydrochloric acid, then with aqueous sodium bicarbonate solution, and finally with water. The washed solution is dried over anhydrous sodium sulfate and filtered. The filtrate is evaporated to dryness. There is thus obtained the 21-methanesulfonate of 9α,15β - difluoro - 11β,17α,21-trihydroxy-1,4-pregnadiene-3,20-dione.

Using the above procedure, but replacing 9α,15β-difluoro-11β,17α,21-trihydroxy-1,4-pregnadiene-3,20-dione by 9α,15β-difluoro-11β,17α,21-trihydroxypregn-4-ene-3-20-dione,
15β-fluoro-11β,17α,21-trihydroxypregn-4-ene-3,20-dione,
15β-fluoro-11β,17α,21-trihydroxy-1,4-pregnadiene-3,20-dione,
15β-fluoro-6α-methyl-11β,17α,21-trihydroxypregn-4-ene-3,20-dione,
15β-fluoro-6α-methyl-11β,17α,21-trihydroxy-1,4-pregnadiene-3,20-dione,
6α,15β-difluoro-11β,17α,21-trihydroxypregn-4-ene-3,20-dione,
6α,15β-difluoro-11β,17α,21-trihydroxy-1,4-pregnadiene-3,20-dione,
6α,9α,15β-trifluoro-11β,17α,21-trihydroxypregn-4-ene-3,20-dione,
6α,9α,15β-trifluoro-11β,17α,21-trihydroxy-1,4-pregnadiene-3,20-dione,
6α-methyl-9α,15β-difluoro-11β,17α,21-trihydroxypregn-4-ene-3,20-dione, or
6α-methyl-9α,15β-difluoro-11β,17α,21-trihydroxy-1,4-pregnadiene-3,20-dione there are produced the 21-methanesulfonates of these compounds.

EXAMPLE 16

*9α,15-Difluoro-11β,17α-Dihydroxy-21-Iodo-1,4-Pregnadiene*

To a solution of 1 g. of 9α,15β-difluoro-11β,17α,21-trihydroxy-1,4-pregnadiene-3,20-dione 21-methanesulfonate in 15 ml. of acetone is added a solution of 1 g. of sodium iodide in 10 ml. of acetone. The mixture so obtained is heated under reflux for a short period and is then concentrated under reduced pressure to about one-third volume. Ice water is added to the concentrate and the solid which separates is isolated by filtration, washed with water and dried. There is thus obtained 9α,15β- difluoro-11β,17α-dihydroxy-21-iodo-1,4-pregnadiene-3,20-dione.

Using the above procedure, but using as starting materials the 21-methanesulfonates of 9α,15β-difluoro-11β,17α,21-trihydroxypregn-4-ene-3,20-dione,
15β-fluoro-11β,17α,21-trihydroxypregn-4-ene-3,20-dione,
15β-fluoro-11β,17α,21-trihydroxy-1,4-pregnadiene-3,20-dione,
15β-fluoro-6α-methyl-11β,17α,21-trihydroxypregn-4-ene-3,20-dione,
15β-fluoro-6α-methyl-11β,17α,21-trihydroxy-1,4-pregnadiene-3,20-dione,
6α,15β-difluoro-11β,17α,21-trihydroxypregn-4-ene-3,20-dione,
6α,15β-difluoro-11β,17α,21-trihydroxy-1,4-pregnadiene-3,20-dione,
6α,9α,15β-trifluoro-11β,17α,21-trihydroxypregn-4-ene-3,20-dione,
6α,9α,15β-trifluoro-11β,17α,21-trihydroxy-1,4-pregnadiene-3,20-dione,
6α-methyl-9α,15β-difluoro-11β,17α,21-trihydroxypregn-4-ene-3,20-dione, or
6α-methyl-9α,15β-difluoro-11β,17α,21-trihydroxy-1,4-pregnadiene-3,20-dione there are produced 9α,15β-difluoro-11β,17α-dihydroxy-21-iodopregn-4-ene-3,20-dione,
15β-fluoro-11β,17α,dihydroxy-21-iodopregn-4-ene-3,20-dione,
15β-fluoro-11β,17α-dihydroxy-21-iodo-1,4-pregnadiene-3,20-dione,
15β-fluoro-6α-methyl-11β,17α-dihydroxy-21-iodopregn-4-ene-3,20-dione,
15β-fluoro-6α-methyl-11β,17α-dihydroxy-21-iodo-1,4-pregnadiene-3,20-dione,
6α,15β-difluoro-11β,17α-dihydroxy-21-iodo-pregn-4-ene-3,20-dione,
6α,15β-difluoro-11β,17α-dihydroxy-21-iodo-1,4-pregnadiene-3,20-dione,
6α,9α,15β-trifluoro-11β,17α-dihydroxy-21-iodopregn-4-ene-3,20-dione,
6α,9α,15β-trifluoro-11β,17α-dihydroxy-21-iodo-1,4-pregnadiene-3,20-dione,
6α-methyl-9α,15β-difluoro-11β,17α-dihydroxy-21-iodopregn-4-ene-3,20-dione, or
6α-methyl-9α,15β-difluoro-11β,17α-dihydroxy-21-iodo-1,4-pregnadiene-3,20-dione, respectively.

EXAMPLE 17

*9α,15β-Difluoro-11β,17α-Dihydroxy-1,4-Pregnadiene-3,20-Dione*

A slurry of 150 mg. of 9α,15β-difluoro-11β,17α-dihydroxy-21-iodo-1,4-pregnadiene-3,20-dione and 150 mg. of sodium iodide in 5 ml. of acetic acid is stirred for 45 minutes before a solution of 250 mg. of sodium thiosulfate pentahydrate in 10 ml. of water is added thereto. When the iodine color has disappeared the mixture is diluted with water and extracted with methylene chloride. The methylene chloride extract is washed with water and then with aqueous sodium bicarbonate solution before being dried over anhydrous sodium sulfate. The dried solution is filtered and the filtrate is evaporated to small volume. The residue is chromatographed on a column of magnesium silicate (Florisil). The column is eluted with Skellysolve B containing increasing proportions of acetone and those fractions which, on the basis of paper chromatographic analysis, are shown to contain the desired product are combined and evaporated to dryness. There is thus obtained 9α,15β-difluoro-11β,17α-dihydroxy-1,4-pregnadiene-3,20-dione in the form of a crystalline solid.

Using the above procedure, but using as starting material

9α,15β-difluoro-11β,17α-dihydroxy-21-iodopregn-4-ene-3,20-dione,
15β-fluoro-11β,17α-dihydroxy-21-iodopregn-4-ene-3,20-dione,
15β-fluoro-11β,17α-dihydroxy-21-iodo-1,4-pregnadiene-3,20-dione,
15β-fluoro-6α-methyl-11β,17α-dihydroxy-21-iodopregn-4-ene-3,20-dione,
15β-fluoro-6α-methyl-11β,17α-dihydroxy-21-iodo-1,4-pregnadiene-3,20-dione,
6α,15β-difluoro-11β,17α-dihydroxy-21-iodopregn-4-ene-3,20-dione,
6α,15β-difluoro-11β,17α-dihydroxy-21-iodo-1,4-pregnadiene-3,20-dione,
6α,9α,15β-trifluoro-11β,17α-dihydroxy-21-iodopregn-4-ene-3,20-dione,
6α,9α,15β-trifluoro-11β,17α-dihydroxy-21-iodo-1,4-pregnadiene-3,20-dione,
6α-methyl-9α,15β-difluoro-11β,17α-dihydroxy-21-iodopregn-4-ene-3,20-dione, or
6α-methyl-9α,15β-difluoro-11β,17α-dihydroxy-21-iodo-1,4-pregnadiene-3,20-dione, there are obtained 9α,15β-difluoro-11β,17α-dihydroxypregn-4-ene-3,20-dione,
15β-fluoro-11β,17α-dihydroxypregn-4-ene-3,20-dione,
15β-fluoro-11β,17α-dihydroxy-1,4-pregnadiene-3,20-dione,
15β-fluoro-6α-methyl-11β,17α-dihydroxypregn-4-ene-3,20-dione,
15β-fluoro-6α-methyl-11β,17α-dihydroxy-1,4-pregnadiene-3,20-dione,
6α,15β-difluoro-11β,17α-dihydroxypregn-4-ene-3,20-dione,
6α,15β-difluoro-11β,17α-dihydroxy-1,4-pregnadiene-3,20-dione,
6α,9α,15β-trifluoro-11β,17α-dihydroxypregn-4-ene-3,20-dione,
6α,9α,15β-trifluoro-11β,17α-dihydroxy-1,4-pregnadiene-3,20-dione,
6α-methyl-9α,15β-difluoro-11β,17α-dihydroxypregn-4-ene-3,20-dione, and
6α-methyl-9α,15β-difluoro-11β,17α-dihydroxy-1,4-pregnadiene-3,20-dione, respectively.

EXAMPLE 18

*9α,15β-Difluoro-11β,17α-Dihydroxy-1,4-Pregnadiene-3,11,20-Trione*

Using the procedure described in Example 8, but replacing 15β-fluoro-11β,17α,21-trihydroxypregn-4-ene-3,20-dione 21-acetate by 9α,15β-difluoro-11β,17α-dihydroxy-1,4-pregnadiene-3,20-dione, there is obtained 9α,15β-difluoro-17α-hydroxy-1,4-pregnadiene-3,11,20-trione.

Similarly

9α,15β-difluoro-11β,17α-dihydroxypregn-4-ene-3,20-dione,
15β-fluoro-11β,17α-dihydroxypregn-4-ene-3,20-dione,
15β-fluoro-11β,17α-dihydroxy-1,4-pregnadiene-3,20-dione,
15β-fluoro-6α-methyl-11β,17α-dihydroxypregn-4-ene-3,20-dione,
15β-fluoro-6α-methyl-11β,17α-dihydroxy-1,4-pregnadiene-3,20-dione,
6α,15β-difluoro-11β,17α-dihydroxypregn-4-ene-3,20-dione,
6α,15β-difluoro-11β,17α-dihydroxy-1,4-pregnadiene-3,20-dione,
6α,9α,15β-trifluoro-11β,17α-dihydroxypregn-4-ene-3,20-dione, 6α,9α,15β-trifluoro-11β,17α-dihydroxy-1,4-pregnadiene-3,20-dione, 6α-methyl-9α,15β-difluoro-11β,17α-dihydroxypregn-4-ene-3,20-dione, and 6α-methyl-9α,15β-difluoro-11β,17α-dihydroxy-1,4-pregnadiene-3,20-dione are oxidized to the corresponding 11-oxo compounds.

EXAMPLE 19

*9α,15β-Difluoro-11β,17α-Dihydroxy-1,4-Pregnadiene-3,20-Dione 17-Acetate*

To a solution of 1 g. of 9α,15β-difluoro-11β,17α-dihydroxy-1,4-pregnadiene-3,20-dione in 15 ml. of acetic acid is added 4 ml. of acetic anhydride. The mixture is purged with nitrogen and cooled whilst 0.4 g. of p-toluene-sulfonic acid is added. The reaction mixture is allowed to stand for several hours and then poured into ice water. The solid which separates is isolated by filtration, washed with water, and recrystallized from aqueous methanol. There is thus obtained 9α,15β-difluoro-11β,17α - dihydroxy - 1,4 - pregnadiene - 3,20 - dione 17-acetate in the form of a crystalline solid.

Using the above procedure but replacing acetic anhydride by the appropriate acid anhydride there are obtained other 17-acylates of 9α,15β-difluoro-11β,17α-dihydroxy-1,4-pregnadiene-3,20-dione.

Similarly, using the above procedure but replacing 9α,15β - difluoro - 11β,17α - dihydroxy-1,4-pregnadiene-3,20-dione by 9α,15β - difluoro-11β,17α- dihydroxypregn-4-ene-3,20-dione, 15β - fluoro - 11β,17α-dihydroxypregn-4-ene-3,20-dione, 15β - fluoro - 11β,17α - dihydroxy-1,4-pregnadiene-3,20-dione, 15β - fluoro-6α-methyl - 11β,17α-dihydroxypregn-4-ene-3,20-dione, 15β - fluoro-6α-methyl-11β,17α - dihydroxy-1,4-pregnadiene-3,20-dione, 6α,15β-difluoro-11β,17α-dihydroxypregn - 4 - ene - 3,20 - dione, 6α,15β-difluoro-11β,17α-dihydroxy - 1,4 - pregnadiene-3,20-dione, 6α,9α,15β-trifluoro-11β,17α-dihydroxypregn-4-ene-3,20-dione, 6α,9α,15β - trifluoro-11β,17α-dihydroxy-1,4-pregnadiene - 3,20 - dione, 6α-methyl-9α,15β-difluoro-11β,17α-dihydroxypregn-4-ene-3,20 - dione, 6α-methyl-9α,15β-difluoro - 11β,17α - dihydroxy-1,4-pregnadiene-3,20-dione or the corresponding 11-oxo derivatives of the above-named compounds there are obtained the corresponding 17-acetates and like 17-acylates of the above compounds.

I claim:
1. A 15β-fluoro compound having the formula

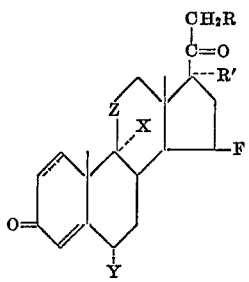

wherein the bond between carbon atoms 1 and 2 is selected from the class consisting of single and double bonds, R is selected from the class consisting of hydrogen, hydroxy, and acyloxy, R' represents hydroxy and, when R represents hydrogen, R' additionally represents a group selected from the class consisting of hydrogen and acyloxy, X is selected from the class consisting of hydrogen and fluorine, Y is selected from the class consisting of hydrogen, fluorine, and methyl, and Z is selected from the class consisting of β-hydroxymethylene and carbonyl, and wherein the acyl of the acyloxy group in each instance is that of a hydrocarbon carboxylic acid containing from 1 to 12 carbon atoms, inclusive.

2. 15β-fluoropregn-4-ene-3,11,20-trione.
3. 15β-fluoro-11β,17α,21 - trihydroxypregn-4-ene-3,20-dione.
4. 15β - fluoro-11β,17α,21-trihydroxypregn-4-ene-3,20-dione 21-acetate.
5. 15β - fluoro-11β,17α,21-trihydroxy-1,4-pregnadiene-3,20-dione.
6. 15β - fluoro-11β,17α,21-trihydroxy-1,4-pregnadiene-3,20-dione 21-acetate.
7. 9α,15β - difluoro-11β,17α,21-trihydroxypregn-4-ene-3,20-dione.
8. 9α,15β - difluoro-11β,17α,21-trihydroxypregn-4-ene-3,20-dione 21-acetate.
9. 9α,15β - difluoro-11β,17α,21-trihydroxy-1,4-pregnadiene-3,20-dione.
10. 9α,15β - difluoro - 11β,17α,21 - trihydroxy - 1,4-pregnadiene-3,20-dione 21-acetate.

No references cited.